(12) United States Patent
Passman

(10) Patent No.: US 6,389,194 B1
(45) Date of Patent: May 14, 2002

(54) METHOD AND APPARATUS FOR COUPLING FIBER OPTIC CABLES

(75) Inventor: William Scott Passman, Lexington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/615,267

(22) Filed: Jul. 13, 2000

(51) Int. Cl.[7] ................................................. G02B 6/26
(52) U.S. Cl. .......................... 385/25; 385/100; 385/136; 385/137
(58) Field of Search .............................. 385/25, 26, 27, 385/28, 31, 33, 42, 100, 123, 136, 137

(56) References Cited

U.S. PATENT DOCUMENTS

| | | | |
|---|---|---|---|
| 1,829,474 A | 10/1931 | Chilowsky | 244/137.1 |
| 2,295,537 A | 9/1942 | Anderson | 244/137.1 |
| 3,724,817 A | 4/1973 | Simons | 258/1.4 |
| 4,315,666 A | 2/1982 | Hicks, Jr. | 385/42 X |
| 4,416,436 A | 11/1983 | Wilson, Jr. | 244/137.1 |
| 4,592,605 A | 6/1986 | Kapler | 439/1 X |
| 4,848,867 A * | 7/1989 | Kajioka et al. | 385/25 X |
| 4,875,646 A | 10/1989 | Browning et al. | 244/190 |
| 4,909,589 A * | 3/1990 | Morris | 385/25 |
| 5,039,193 A * | 8/1991 | Snow et al. | 385/25 |
| 5,088,663 A | 2/1992 | Henson | 244/137.4 |
| 5,542,012 A * | 7/1996 | Fernandes et al. | 385/25 |
| 5,722,618 A | 3/1998 | Jacobs et al. | 244/137.1 |
| 6,061,562 A | 5/2000 | Martin et al. | 455/431 |
| 6,086,015 A | 7/2000 | MacCready, Jr. | 244/137.1 |

* cited by examiner

*Primary Examiner*—Brian Healy
(74) *Attorney, Agent, or Firm*—Leonard Charles Suchyta; James K. Weixel

(57) ABSTRACT

A device (300) for coupling a first and a second fiber optic cable (120, 140) is provided. The device (300) includes a first member (310) having an opening to receive the first fiber optic cable (120). The device (300) also includes a mechanism (314) to secure the first fiber optic cable (120) to the first member (310) and to constrain rotation of the first fiber optic cable (120) relative to the first member (310). The device (300) also includes a second member (320) having an opening to receive the second fiber optic cable (140). The first and second members (310, 320) are coupled together to align the first and second fiber optic cables (120, 140) and to allow the first member (310) to rotate with respect to the second member (320).

25 Claims, 5 Drawing Sheets

METHOD AND APPARATUS FOR COUPLING FIBER OPTIC CABLES

CROSS-REFERENCE TO RELATED APPLICATIONS

This application is related to the following commonly assigned, copending application U.S. Ser. No. 09/615,396 filed Jul. 13, 2000, pending entitled: SYSTEMS AND METHODS FOR USING AIRBORNE COMMUNICATION NODES.

FIELD OF THE INVENTION

The present invention relates generally to data communications and, more particularly, to a connection device for coupling fiber optic cables.

BACKGROUND OF THE INVENTION

Spurred by technological advances, the telecommunications industry has experienced tremendous growth over the last decade. Due to this growth, along with an increasing demand for higher speed communications, fiber optic cables are frequently used to transmit information. These fiber optic cables are often connected to other fiber optic cables and to various electronic equipment using conventional connectors and splicing techniques.

One problem with typical connectors is that the fiber optic link experiences some optical loss at the connection. For example, the two fiber optic cables being connected may not be properly aligned, resulting in a significant loss of light energy and therefore, signal distortion. One typical way to avoid these problems is to apply an optically transparent glue to the fiber optic cables to keep the cables aligned and to help lower the optical loss.

However, in situations where one of the fiber optic cables may be moving or rotating, glue cannot be used without impeding the movement of the moving fiber optic cable. In these situations, the user must ultimately hope that the fiber optic cables remain aligned to permit a sufficient portion of the optical signal to be transmitted through the connector so that the signal can be adequately detected and decoded at the destination. Often times, however, the optical loss or signal distortion makes it impossible for the signal to be adequately decoded at the destination. Worse yet, in some situations, twisting of the moving fiber optic cable results in the fiber optical cable breaking.

Therefore, there exists a need for a device that couples fiber optic cables that may be moving and minimizes optical losses.

SUMMARY OF THE INVENTION

Systems and methods consistent with the present invention address these and other needs by employing a connection device for coupling fiber optic cables. The connection device includes a rotating-side alignment device and a fixed-side alignment device. A moving fiber optic cable may be secured to the rotating-side alignment device. The rotating-side alignment device is then coupled to the fixed-side alignment device to permit the rotating side to rotate with respect to the fixed side. In this manner, the fiber optic cable and the rotating side move together, thereby ensuring that the fiber optic cable does not twist.

In accordance with the purpose of the invention as embodied and broadly described herein, a device for coupling a first and a second fiber optic cable is provided. The device includes a first member having a first opening to receive the first fiber optic cable and at least one clamp to secure the first fiber optic cable to the first member. The clamp constrains rotation of the first fiber optic cable relative to the first member. The device also includes a second member having a first opening to receive the second fiber optic cable, the second member connecting to the first member to allow for coupling of the first and second fiber optic cables and to allow rotation of the first member with respect to the second member.

In another aspect of the present invention, a method for coupling first and second fiber optic cables is provided in a system where at least one of the first and second fiber optic cables may be subjected to being twisted. The method includes inserting a first fiber optic cable into a first end of a connector and securing the first fiber optic cable to the first end. The method also includes inserting a second fiber optic cable into a second end of the connector and attaching the first end of the connector to the second end to permit the first fiber optic cable and the first end to rotate together around a common point on the second end.

In still another aspect of the present invention, a system for coupling fiber optic cables is provided. The system includes a first fiber optic cable and a first member having a first opening to receive the first fiber optic cable. The first member is secured to the first fiber optic cable and constrains rotation of the first fiber optic cable relative to the first member. The system also includes a second fiber optic cable and a second member having a second opening to receive the second fiber optic cable. The second member is coupled to the first member and permits the first member to rotate with respect to the second member.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a connector for coupling fiber optic cables. The connector includes a rotating side and a fixed side. The rotating side secures a fiber optic cable that may be moving or rotating. The rotating side and fixed side are then coupled to align the fiber optic cables and to allow the rotating side to rotate with respect to the fixed side. In this manner, the moving fiber optic cables moves with the rotating side to ensure that the cables remain aligned and that the fiber optic cable does not twist.

EXEMPLARY METHOD FOR LINKING TO AN AIRBORNE NODE

Figure 1:
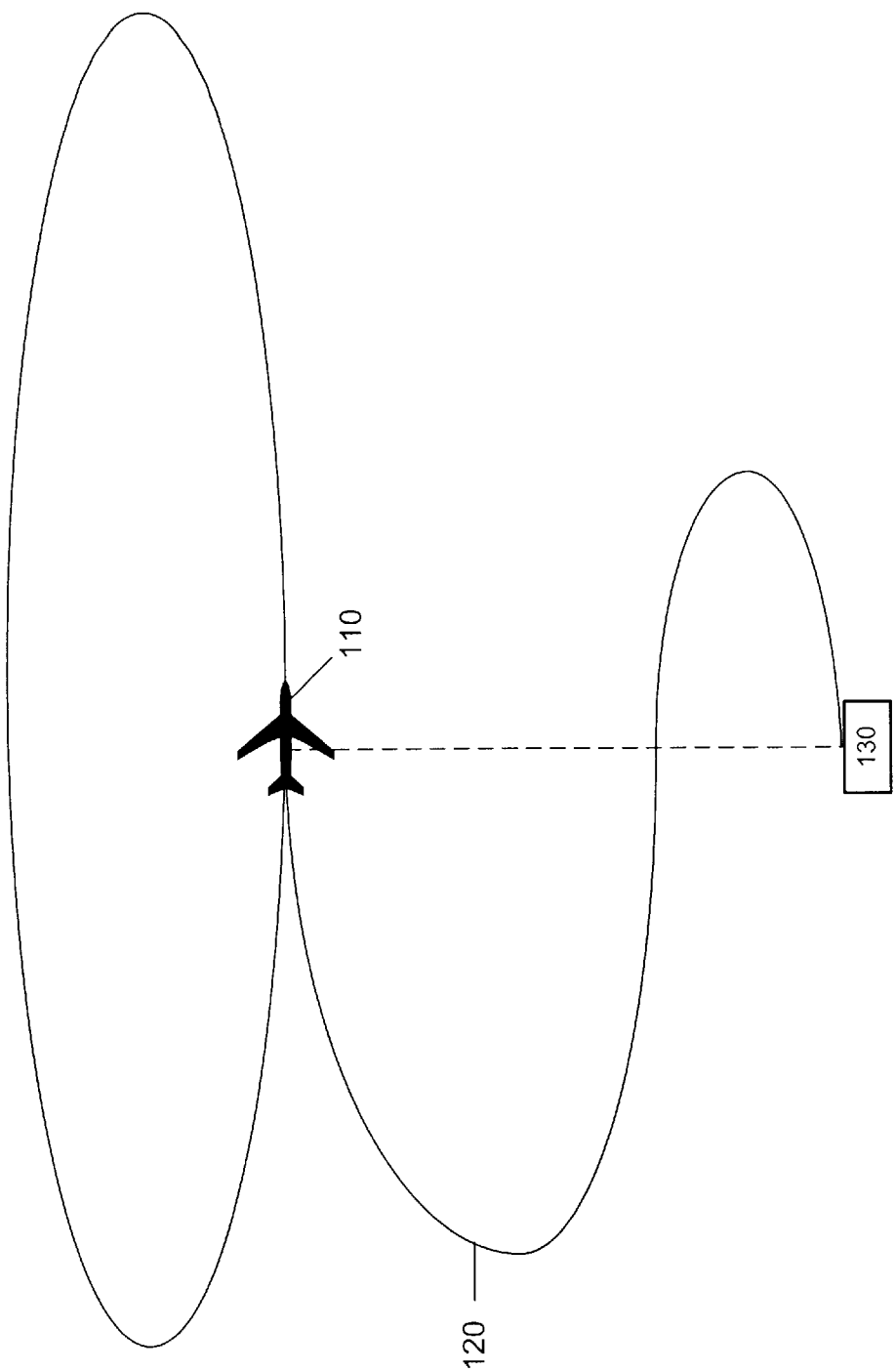
FIG. 1 illustrates an exemplary system in which methods and systems consistent with the present invention may be implemented.

FIG. 1 illustrates an exemplary system in which methods and systems consistent with the present invention may be implemented. The system 100 includes an airplane 110, a communications link 120 and a node 130. In FIG. 1, the airplane 110 represents an airborne node connected via communications link 120 to node 130. The airplane 110, also referred to as the airborne node, may be piloted or remotely controlled and may range in size from that of a very small remotely controlled drone to that of a large commercial jet. In alternative implementations, a helicopter or some other type of aircraft may be used instead of an airplane. The airplane 110 may include equipment, such as radar equipment, video equipment, transmitters/receivers, weather instruments, etc. for obtaining data. Such data may be transmitted to various personnel and systems located at other locations. For example, the data may be intended for transmission to node 130.

The node 130 may be a point on the ground where the communication link 120 may be connected to a network (not shown) so that the airborne node 110 may transmit and receive information to/from other nodes. Alternatively, the node 130 may be located on a ship in some body of water.

The communications link 120, consistent with the present invention, includes a conventional fiber optic cable. The communications link 120, also referred to as the fiber optic cable, may be coupled to the equipment on the airplane 110 through a network interface device, such as a network interface card, a router or a server-type device (not shown). Similarly, the communications link 120 may be coupled to equipment at node 130 through a similar network interface device. Data may then transmitted from node 110 to node 130 via the fiber optic cable 120 in a conventional manner.

The node 130 provides a connection from the airborne node 110 to other nodes, networks or systems (not shown). The node 130, as described in more detail below, may include a connector that permits airborne node 110 and node 130 to remain adequately coupled even when the fiber optic cable 120 is moving.

EXEMPLARY METHOD FOR CONNECTING AN AIRBORNE NODE TO ANOTHER NODE IN A NETWORK

Figure 2:
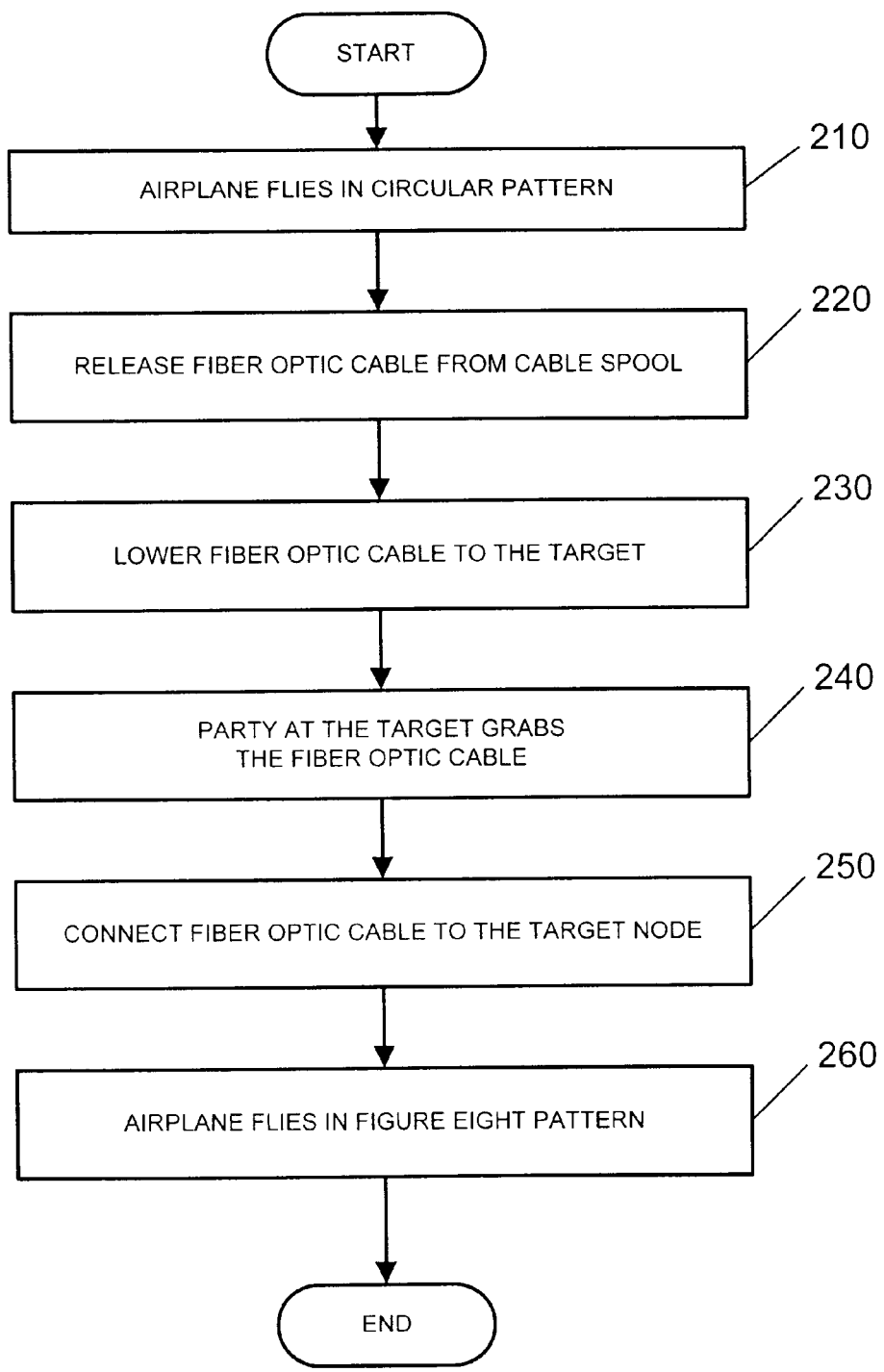
FIG. 2 is a flowchart illustrating an exemplary method for providing a communications link to a designated target.

FIG. 2 illustrates an exemplary method for linking the airborne node 110 to other nodes/systems, such as node 130. The airplane 110, consistent with the present invention, includes a conventional cable spool. The particular length of cable may be based on the particular circumstances. The airplane 110 begins operations by flying in essentially a circular or elliptical flight path, as illustrated in FIG. 1 (step 210). The airplane's 110 particular flight speed may be calculated based on the physical properties of the fiber optic cable 120, such as the weight, to optimize the release of the fiber optic cable 120. Personnel in the cargo area of the airplane 110 then begin unrolling the fiber optic cable 120 from the cable spool so that the cable trails behind the airplane 110 (step 220). As the fiber optic cable 120 begins unrolling, the fiber optic cable 120 twirls like a jump rope or lasso, as shown in FIG. 1, as it trails the airplane 110. It should be noted that some points in the fiber optic cable 120 are static in horizontal motion as the airplane 110 circles. That is, there will be one or more points that remain directly under the center of the circular path in which the airplane 110 is flying.

The airplane 110 then slowly lowers its altitude until the end of the fiber optic cable 120 is directly over the target intended to receive the fiber optic cable 120 (step 230). The target may be a point on the ground or on a ship, such as node 130. A person at node 130, then grabs the end of the fiber optic cable 120 (step 240). Alternatively, the person grabs a small controller on the end of the fiber optic cable 120. This may be done by hand or with the assistance of a grabbing tool for safety. The person then attaches the cable 120 to an interface device at node 130 (step 250). The interface device may be any conventional device linking fiber optic cable 120 to other equipment.

In this manner, airborne node 110 and node 130 may be connected to allow data to be transmitted between the nodes. Additionally, since the communication link 120 is a fiber optic link, the airborne node 110 and node 130 may transmit data at rates in the gigabit/second range and above. Advantageously, the fiber optic cable 120 also provides a more secure communications link than conventional wireless links used to communicate from airborne nodes, which are susceptible to being intercepted or jammed by the enemy. According to an implementation consistent with the present invention, after the airborne node 110 is connected to node 130, the airplane 110 may change its circular flight path to a figure eight pattern (step 260). This figure eight pattern alleviates the problem of the fiber optic cable 120 twisting while the airplane 110 is connected to node 130. By flying in the figure eight pattern, the fiber optic cable 120 remains free of twists which could damage or even break the cable 120, thereby increasing the reliability of the link between the airborne node 110 and node 130.

According to another implementation consistent with the present invention, a connecting device may be used to ensure that the fiber optic cable 120 does not become twisted while the airborne node 110 is connected to node 130.

EXEMPLARY CONNECTION DEVICE FOR COUPLING FIBER OPTIC ABLES

Figure 3:
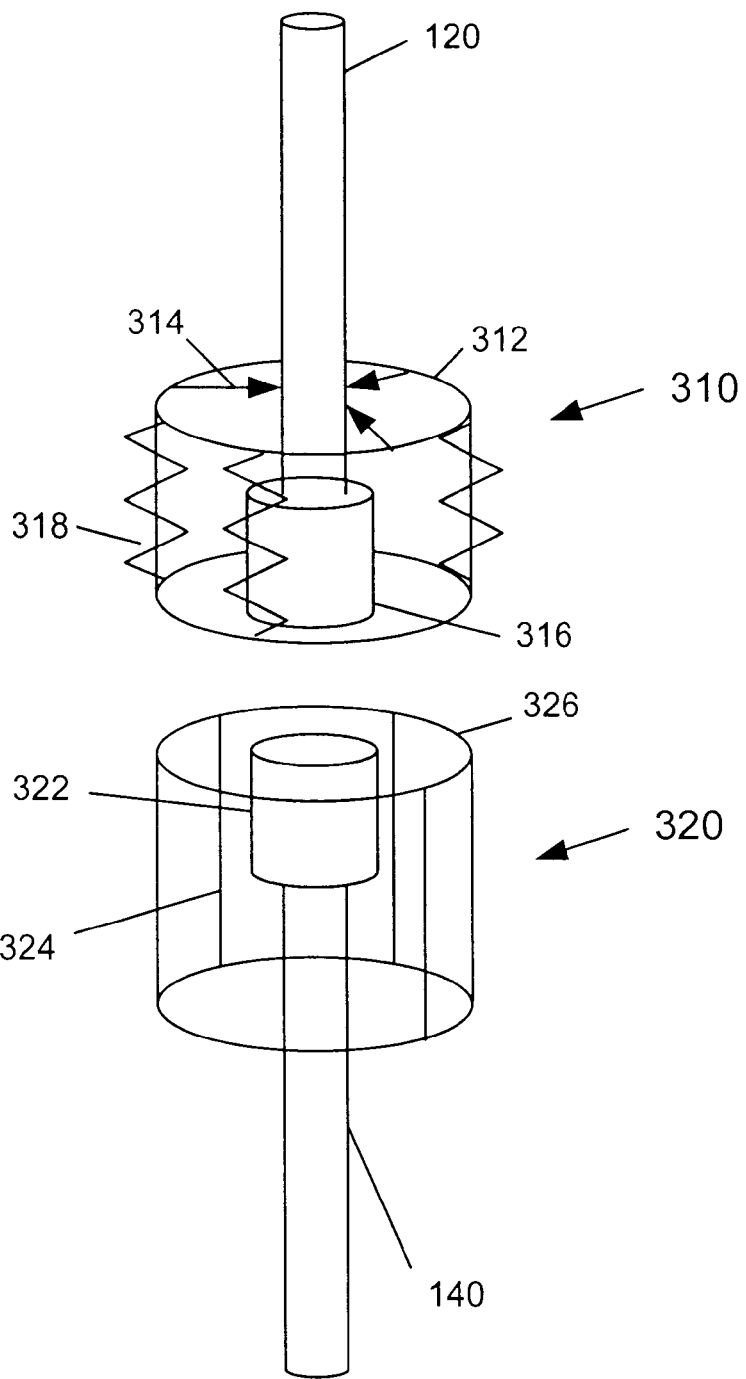
FIG. 3 is an exemplary connector, consistent with the present invention, for coupling two fiber optic cables.

FIG. 3 is a diagram illustrating an exemplary connector 300 that may be used to connect the fiber optic cable 120 to a device at node 130. The connector 300, consistent with the present invention, includes a rotating-side alignment device 310 and a fixed-side alignment device 320 used to couple the fiber optic cable 120 from the airplane 110 (FIG. 1) to a fiber optic cable 140 at node 130. The fiber optic cable 140 facilitates connecting the fiber optic cable 120 to equipment at node 130.

According to an exemplary implementation, the rotating-side alignment device 310 is cylindrical with an opening provided for fiber optic cable 120. The opening is sized to receive any fiber optical cable, such as fiber optic cable 120. The rotating-side alignment device 310 also includes a mechanism for ensuring that the fiber optic cable 120 does not rotate independently of device 310.

For example, the top portion 312 of the rotating-side alignment device 310 may include one or more clamps 314 for rigidly securing the fiber optic cable 120 to the rotating-side alignment device 310. According to the exemplary implementation illustrated in FIG. 3, the rotating-side alignment device 310 uses three clamps 314 to secure the fiber optic cable 120. In other implementations, more or less clamps may be used, or any other mechanism may be used to ensure that the fiber optic cable 120 is rigidly secured to the rotating-side alignment device 310. For example, the opening in the rotating-side alignment device 310 may include a sleeve or collar that receives the fiber optic cable 120 and secures the fiber optic cable 120 to the device 310. The fiber optic cable 120 and the rotating-side alignment device 310 are then able to rotate together with respect to the fixed-side alignment device 320.

The bottom portion of the rotating-side alignment device 310, consistent with the present invention, may also include a conventional fiber connector 316 for receiving the fiber optic cable 120. In alternative implementations, the opening in the rotating-side alignment device 310 may run the entire length of the device and be sized to receive fiber optic cable 120 and fiber connector 316.

The rotating-side alignment device 310 may also include at least one spring 318 that runs essentially parallel to the fiber optic cable 120. The spring 318 helps ensure that the rotating-side alignment device 310 and the fixed-side alignment device 320 are kept in contact with each other. In the exemplary implementation illustrated in FIG. 3, three springs 318 are illustrated. Other numbers of springs 318 may be used in alternative implementations.

The fixed-side alignment device 320, consistent with the present invention, is cylindrical with an opening provided for a fiber optic cable. The opening is sized to receive any fiber optical cable, such as fiber optic cable 140. The top portion 326 of the fixed-side alignment device 320, consistent with the present invention, may also include a conventional fiber connector 322 for receiving the fiber optic cable 140. The fiber connector 322 may be similar to the fiber connector 316 provided in the rotating-side alignment device 310. In alternative implementations, the opening in the fixed-side alignment device 320 may run the entire length of the device and be sized to receive fiber optic cable 140 and fiber connector 322.

According to an exemplary implementation, the fixed-side alignment device 320 includes three rigid supports 324 for increasing the sturdiness of the device 320. The fixed-side alignment device 320 may optionally include clamps (not shown) for further securing the fiber optic cable 140 to device 320.

The fixed-side alignment device 320 is coupled to the rotating-side alignment device 310 so that the fibers 120 and 140 are aligned and are able to adequately transmit information without significant distortion or loss. According to the exemplary implementation, the rotating-side alignment device 310 rotates with the fiber optic cable 120 as the airplane 110 flies in a circular pattern. Advantageously, since both the fiber optic cable 120 and the rotating contact mechanism 310 rotate together, the fiber optic cable 120 does not twist, thereby reducing the chances that the fiber optic cable 120 will become damaged or break. In this manner, even when the airplane 110 flies in a tight circle, the fiber optic cable 120 does not twist.

Figure 4A:
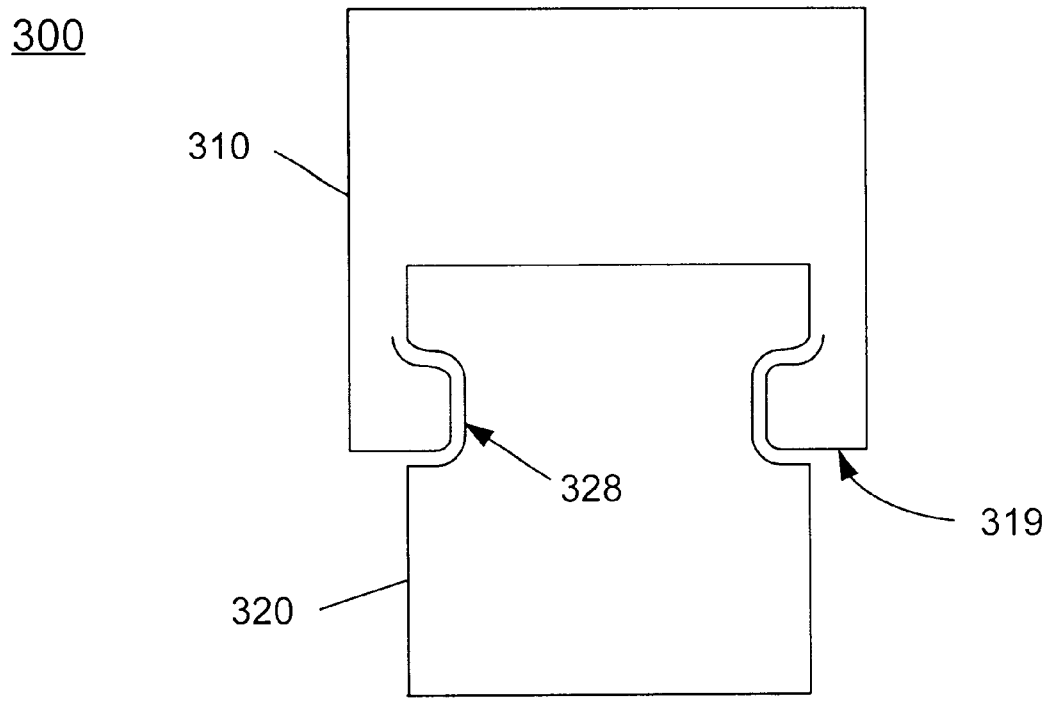
FIG. 4A illustrates a profile of the connector of FIG. 3, according to an exemplary implementation of the present invention.

FIG. 4A illustrates a side view of connector 300, consistent with an exemplary implementation of the present invention. Referring to FIG. 4A, the rotating-side alignment device 310 includes a lip or rim 319 that extends over a portion of the fixed-side alignment device 320. The fixed-side alignment device 320 includes a groove or slot 328 for receiving and securing the rim 319. In this manner, the rotating-side alignment device 310 and the fixed-side alignment device 320 are connected to permit the fiber optic cable 120 to transmit information to fiber optic cable 140.

Figure 4B:
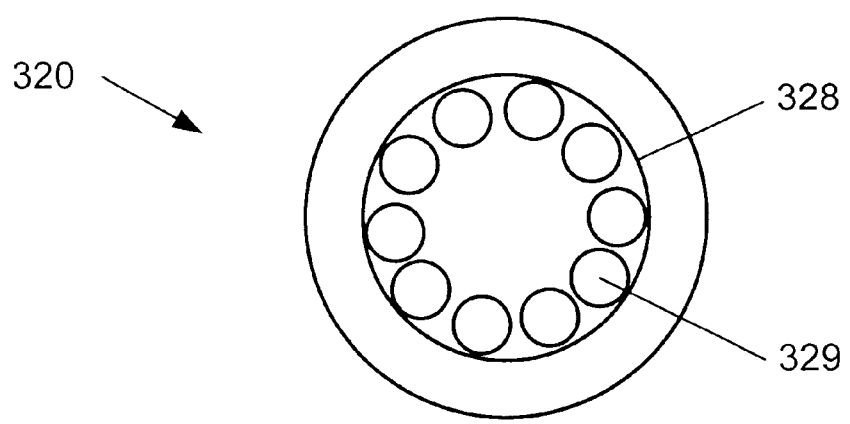
FIG. 4B illustrates an exemplary top view of a part of the connector of FIG. 3, according to an exemplary implementation of the present invention.

FIG. 4B illustrates a top view of the fixed-side alignment device 320, according to an exemplary implementation of the present invention. As illustrated in FIG. 4B, the fixed-side alignment device 320 includes ball bearings 329 in a conventional ball bearing assembly to further facilitate movement of the rotating-side alignment device 310 in the groove 328. Alternatively, the groove 328 may be coated with Teflon or a similar material to reduce the friction associated with the rotating-side alignment device 310 rotating in groove 328.

In alternative implementations, the fixed-side alignment device 320 may include a lip that extends over a groove on the rotating-side alignment mechanism 310 to couple the two sides. In further alternatives, any number of mechanisms that would be obvious to one of ordinary skill in the art may be used to couple the rotating-side alignment device 310 to the fixed-side alignment device 320 to enable the rotating side to rotate freely with respect to the fixed side. It should be understood, however, that in any of these scenarios, the rotating-side alignment device 310 must be able to freely rotate with respect to the fixed-side alignment device 320 as the airplane 110 circles overhead, while remaining coupled and aligned with the fixed-side alignment device 320. In this manner, the fiber optic cable 120 and the rotating-side alignment device 310 rotate with the airplane 110, thereby alleviating stress on the cable 120 by ensuring that the fiber optic cable 120 does not become twisted. The fiber optic cable 140 may then be connected in any conventional manner to equipment at node 130.

According to an exemplary implementation, an optically transparent fluid or film may also be employed to further facilitate the coupling of fiber optic cables 120 and 140. For example, an optically transparent fluid or film may be inserted between fiber connectors 316 and 322 to reduce the wear associated with movement of the fiber connectors. The fluid or film may be applied to one or both of the surfaces of the connectors 316 and 322 that will contact the other respective fiber connector. For example, the fluid or film may be applied to the bottom surface of fiber connector 316 and to the top surface of fiber connector 322 to reduce the wear on the fiber connectors while they are contacting each other. Any particular fluid or film may be used that does not refract or reflect the optical transmissions between the fiber connectors 316 and 322.

After the connection from the airborne node 110 to the equipment at node 130 has been made, the airborne node 110 may continue to fly in a figure eight pattern or a circular pattern, depending on whether connector 300 is used. In additional implementations consistent with the present invention, an aerostat may also be used to provide a link to node 130.

EXEMPLARY METHOD FOR USING AN AEROSTAT TO COMMUNICATE WITH LAND OR SEA-BASED NODES

Figure 5:
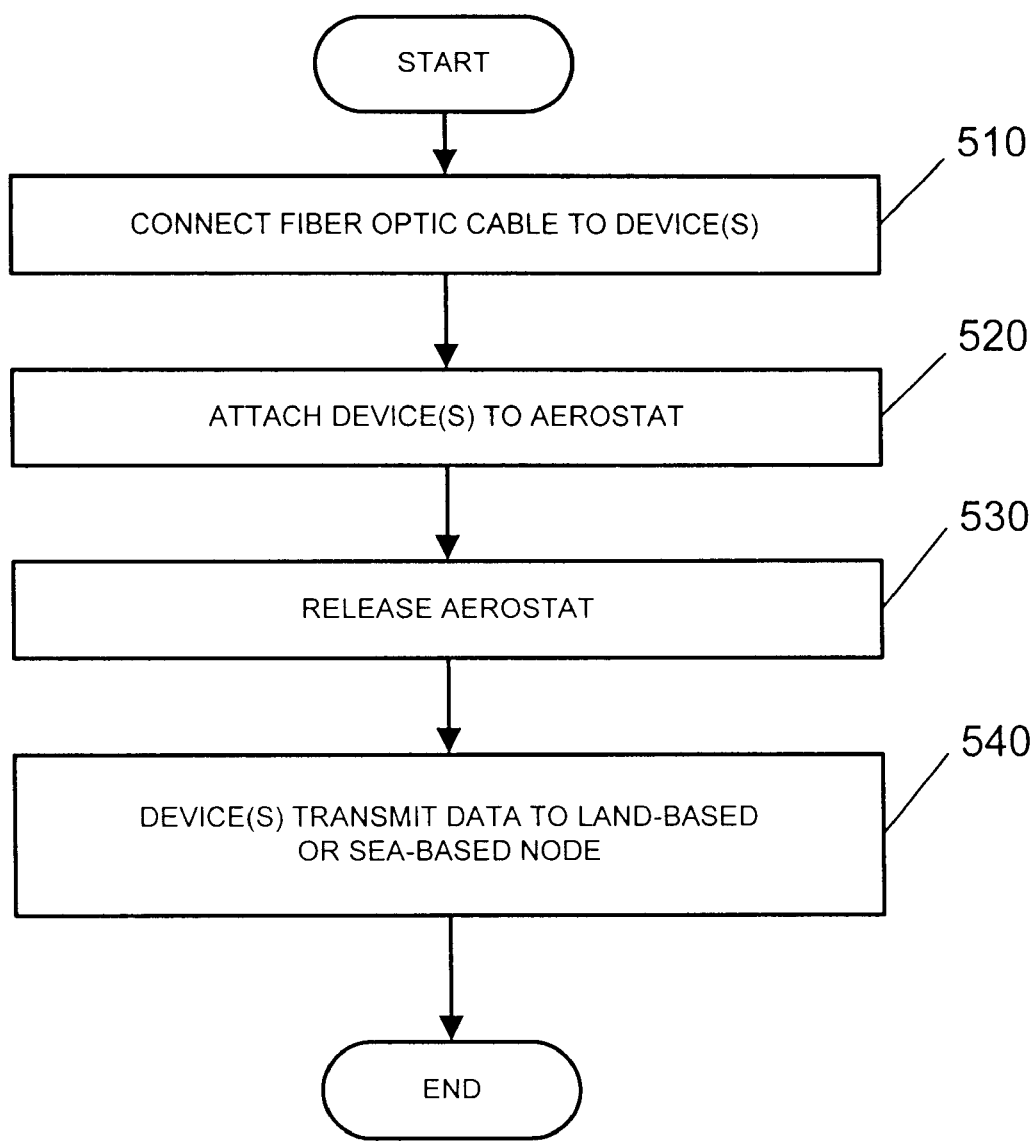
FIG. 5 is an exemplary flowchart illustrating the use of an aerostat, according to an exemplary implementation of the present invention.

FIG. 5 illustrates an exemplary method for using an aerostat to communicate with node 130. After connecting the fiber optic cable 120 to node 130, a person in the airplane 110 may attach various devices to the fiber optic cable 120 (step 510). Such devices may include radio equipment, video equipment, sensors, weather observation equipment, etc, based on the user's particular requirements. In certain implementations of the present invention, the fiber optic cable 120 may first be coupled to an interface device, which is then coupled to the various data gathering devices in the airplane 110. These devices, and the interface device if applicable, are then attached to the aerostat (step 520). The aerostat is then released from the airplane 110 to float in the air above node 130 (step 530). The particular altitude of the aerostat may be based on the particular user requirements. For example, in situations where the aerostat includes various video equipment, the length of fiber optic cable 120 may be set to allow the aerostat to float at an altitude above the tree line. It should be noted that fiber optic cable 120 may act as both a tether line and a communication link to node 130. In alternative implementations, a separate tether line may be provided.

The particular equipment in the aerostat then gathers data and transmits this data to node 130 via fiber optic cable 120 (step 540). Alternatively, the aerostat may receive control commands from node 130 to control the various equipment on the aerostat. Advantageously, such a system enables personnel at node 130 to have an airborne node 110 without requiring an airplane to remain in the area. Another advantage of using an aerostat is that it is less likely to be detected than an airplane. This is especially important in military or security operations. A further advantage of the invention is that deploying the aerostat from an airplane saves ground personnel from having to carry the aerostat and related equipment over rugged terrain, such as a mountain, in order to deploy an airborne node.

According to another implementation consistent with the present invention, the aerostat may be attached to the fiber optic cable 120, as described above, and then another fiber optic cable may be attached from the airplane 110 to the aerostat. Alternatively, the aerostat and the airplane 110 may both be attached to fiber optic cable 120 via conventional splices. In either case, the airplane 110 then flies off connected to the aerostat. As the airplane 110 flies away, the fiber optic cable connecting the airplane 110 to the aerostat may sag and drape over the landscape. However, by connecting the aerostat to the airplane 110, the range of connectivity of the aerostat would advantageously extend to devices such as radios, sensors, cameras and the like, on the airplane 110.

According to a further implementation consistent with the present invention, the airplane 110 could also be used to deliver a communication link to two land-based or sea-based nodes. For example, suppose that the airplane 110 delivers one end of the fiber optic cable 120 to the target at node 130, as described in relation to FIG. 2. The airplane 110 then flies away remaining connected to the fiber optic cable 120. The fiber optic cable 120 may sag and drape over the landscape. The airplane 110 then deposits the other end of the fiber optic cable 120 to a second target location. For example, a parachute may by attached to the end of the fiber optic cable 120 and released over the second target destination. In wartime, this could allow for the rapid deployment of direct communication cables over long distances or otherwise over unpassable terrain.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the present invention is described in an environment where the connector 300 is used in conjunction with a fiber optic cable connected to an aircraft circling overhead. The connector 300, however, may be used in other situations where a fiber optic cable may be moving, to provide relief from twisting cables. For example, connector 300 may be used in situations where a fiber optic cable is connected to a piece of equipment that may be rotating. The connector 300 may also be used in a situation where a fiber optic cable is being installed in a space that requires many turns, such as a home or office. In these situations, the connector 300 would eliminate the twisting of the fiber optic cable during the installation of the cable, thereby providing stress relief.

What is claimed is:

1. A device for coupling a first and a second fiber optic cable, comprising:
   a first member having a first opening to receive the first fiber optic cable;
   at least two clamps to secure the first fiber optic cable to the first member, the clamps constraining rotation of the first fiber optic cable relative to the first member; and
   a second member having a second opening to receive the second fiber optic cable, the second member connecting to the first member to allow for coupling of the first and second fiber optic cables and to allow rotation of the first member with respect to the second member.

2. The device of claim 1, wherein the first member includes a first fiber optic connector for coupling to the first fiber optic cable.

3. The device of claim 2, wherein the second member includes a second fiber optic connector for coupling to the second fiber optic cable, the first and second fiber optic connectors being substantially aligned.

4. The device of claim 3, further comprising:
   an optically transparent film located on a surface of at least one of the first and second fiber optic connectors, wherein the optically transparent film forms a contact between the first and second fiber optic connectors.

5. The device of claim 1, wherein the at least two clamps are configured to maintain the first fiber optic cable in a position substantially in the center of the first opening.

6. The device of claim 5, wherein the at least two clamps comprises three clamps.

7. The device of claim 5, wherein the first member is cylindrical and includes at least one spring running the length of the member.

8. The device of claim 1, further comprising a ball bearing assembly located between the first and second members.

9. In a system including a first and a second fiber optic cable, where at least one of the first and second fiber optic cables may be subjected to being twisted, a method for coupling the first and second fiber optic cables, comprising:
   inserting a first fiber optic cable into a first end of a connector;
   securing the first fiber optic cable to the first end;
   inserting a second fiber optic cable into a second end of the connector; and
   attaching the first end of the connector to the second end to permit the first fiber optic cable and the first end to rotate together around a common point on the second end, wherein the attaching includes placing a portion of the first end of the connector into a groove in the second end of the connector.

10. The method of claim 9, wherein the securing includes:
    clamping the first fiber optic cable to the first end.

11. The method of claim 9, further comprising:
    coating the groove with a friction reducing material.

12. The method of claim 9, further comprising:

attaching an optically transparent film between the first and second ends of the connector.

13. A connector for coupling two fiber optic cables, comprising:

a first means for receiving a first fiber optic cable;

means for securing the fiber optic cable to the first means;

a second means for receiving a second fiber optic cable; and means for connecting the first and second means to permit coupling of the first and second fiber optic cables and to permit the first means and the first fiber optic cable to rotate together with respect to the second means, wherein the means for securing comprises at least two clamps.

14. A device for coupling a first and a second fiber optic cable, comprising:

a first member having an opening at one end to receive the first fiber optic cable and a fiber optic connector at the other end, the fiber optic connector configured to attach to the first fiber optic cable;

a securing device to secure the first fiber optic cable to the first member, the securing device comprising at least two clamps constraining rotation of the first fiber optic cable relative to the first member; and a second member having an opening at one end to receive the second fiber optic cable and a fiber optic connector at the other end, the fiber optic connector configured to attach to the second fiber optic cable, the second member connecting to the first member to permit the first member and the first fiber optic cable to rotate together with respect to the second member.

15. The device of claim 14, wherein the first and second members are cylindrical.

16. The device of claim 15, wherein the at least two clamps are located adjacent the opening in the first member, the clamps securing the first fiber optic cable to the first member.

17. A device for coupling a first and a second fiber optic cable, comprising:

a first cylindrical member having an opening at one end to receive the first fiber optic cable and a fiber optic connector at the other end, the fiber optic connector configured to attach to the first fiber optic cable;

a securing device to secure the first fiber optic cable to the first member, the securing device comprising a sleeve located in the opening of the first member, the sleeve securing the first fiber optic cable to the first member and constraining rotation of the first fiber optic cable relative to the first member; and a second cylindrical member having an opening at one end to receive the second fiber optic cable and a fiber optic connector at the other end, the fiber optic connector configured to attach to the second fiber optic cable, the second member connecting to the first member to permit the first member and the first fiber optic cable to rotate together with respect to the second member.

18. A device for preventing twisting of a fiber optic cable, comprising:

a first member having a first opening to receive a first fiber optic cable, the first opening extending through at least a portion of the first member, the first member including a fiber optic connector for receiving the first fiber optic cable;

at least one clamp to secure the first fiber optic cable to the first member, the clamp constraining rotation of the first fiber optic cable relative to the first member; and a second member having a second opening to receive a second fiber optic cable, the second opening extending through at least a portion of the second member, the second member including a fiber optic connector for receiving the second fiber optic cable, wherein a groove in the second member connects to a rim at one end of the first member, the rim extending into the groove to connect the first and second members to each other and to permit the first member to rotate with respect to the second member.

19. The device of claim 18, wherein the first and second fiber optic connectors are substantially aligned.

20. The device of claim 18, wherein the at least one clamp comprises two clamps.

21. A system for coupling fiber optic cables, comprising:

a first fiber optic cable;

a first member having a first opening to receive the first fiber optic cable;

at least one clamp configured to secure the first fiber optic cable to the first member and to constrain rotation of the first fiber optic cable relative to the first member;

a second fiber optic cable; and a second member having a second opening to receive the second fiber optic cable, the second member coupled to the first member to permit the first member to rotate with respect to the second member.

22. The system of claim 21, wherein the at least one clamp comprises three clamps.

23. The system of claim 21, further comprising:

a first fiber optic connector located adjacent the first opening and connected to the first fiber optic cable.

24. The system of claim 23, further comprising:

a second fiber optic connector located adjacent the second opening and connected to the second fiber optic cable, the first and second fiber optic connectors being substantially aligned and contacting each other to permit transmission of optical energy between the connectors.

25. A device for coupling a first and a second fiber optic cable, comprising:

a first member having a first opening to receive the first fiber optic cable and including at least one spring running the length of the first member;

at least one clamp to secure the first fiber optic cable to the first member and configured to maintain the first fiber optic cable in a position substantially in the center of the first opening, the clamp constraining rotation of the first fiber optic cable relative to the first member; and a second member having a first opening to receive the second fiber optic cable, the second member connecting to the first member to allow for coupling of the first and second fiber optic cables and to allow rotation of the first member with respect to the second member.

\* \* \* \* \*